Figure 1:
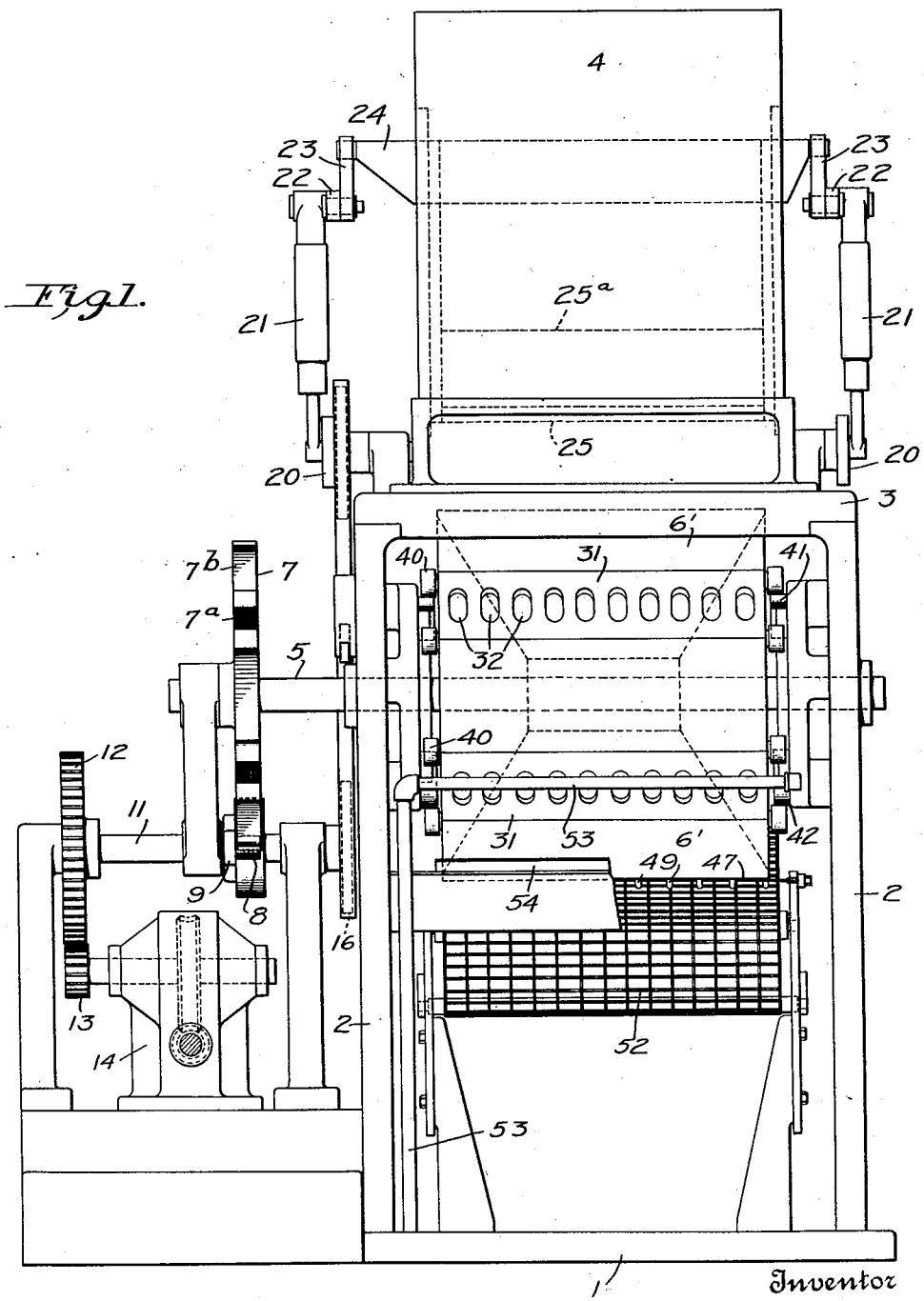

May 7, 1935. J. G. KAZANJIAN 2,000,027
MOLDING MACHINE
Original Filed Nov. 13, 1929 5 Sheets-Sheet 1

Inventor
John G. Kazanjian
By Attorneys
Nathan & Bowman

May 7, 1935.    J. G. KAZANJIAN    2,000,027
MOLDING MACHINE
Original Filed Nov. 13, 1929    5 Sheets-Sheet 2

Inventor
John G. Kazanjian
By Attorneys
Nathan & Bowman

May 7, 1935.  J. G. KAZANJIAN  2,000,027
MOLDING MACHINE
Original Filed Nov. 13, 1929   5 Sheets-Sheet 5

Inventor
John G. Kazanjian
By Attorneys
Nathan & Bowman

Patented May 7, 1935

2,000,027

UNITED STATES PATENT OFFICE 2,000,027

MOLDING MACHINE

John G. Kazanjian, Naugatuck, Conn., assignor to Peter Paul Incorporated, Naugatuck, Conn., a corporation of Connecticut Application November 13, 1929, Serial No. 406,797
Renewed July 14, 1932

11 Claims. (Cl. 107—8)

This invention proposes a new and useful improvement in molding machines and it relates more particularly, to machines adapted to be used in candy making and like industries wherein the practical application of sanitary science is required.

It has been customary in candy making industries, to form various kinds and shapes of molded candy by hand, that is, with small molding machines operated by one hand of the operator while preparing the bulk with the other. This manner of forming the units required, for a given output, the employment of from fifteen to twenty persons, and regardless of the rules promulgated as to cleanliness, a certain amount of foreign matter unavoidably is present, and from a practical standpoint the methods heretofore employed have been more or less unsanitary.

This new machine, constructed in a manner hereinafter described, produces, with a single attendant, said given output far more satisfactorily and under more sanitary conditions than has heretofore been attainable.

An object of the present invention is to provide a machine capable of effecting the rapid and automatic transformation of large quantities of plastic candy into small salable units in a most sanitary and efficient manner.

A further object is to provide a machine with a cleansing apparatus, whereby each mold, before being filled or used a second time, will be washed out automatically, immediately after the finished product is discharged therefrom.

Another object is to provide a molding machine of this character with means for varying the depth of the matrices so that the same forms or molds may be used for a plurality of different sizes or types of the molded articles or so that variations in the weight of the product may be easily accomplished.

A further object is to construct a single molding machine of which the matrices are capable of being removed and replaced by others of different dimensions or shape, dependent upon the desired form of the finished product, inserted.

Still another object of primary importance is to provide, in a continuously operating molding machine, means for automatically separating the molded products from the forms as they reach the discharging position. The sticking of the products to the molds is thereby positively overcome and the output of the machine remains uniform throughout its period of operation.

These objects and others, which will hereafter become apparent, have been accomplished by constructing a machine with an indexable matrix carrier supported above a moving conveyor. The carrier supports a plurality of series of matrices, or forms, adapted successively to be filled from a tapered bin or hopper mounted above the carrier.

Briefly stated, the machine operates as follows: the carrier is indexed to bring one section of molds up to and under the hopper, candy is then pressed into each mold of said section and the carrier is again indexed. At the beginning of the indexing movement the candy within the mold is sheared from the mass within the hopper, leaving the mold completely filled and level with the periphery of the carrier. The carrier is rotated further until the filled molds approach their lowest position and during this further movement the candy is ejected from the mold and deposited upon said moving conveyor which carries them away from the machine. Between the discharging position and the filling position the empty molds are indexed to a cleansing station where each is washed preparatory to being refilled. This completes the cycle. Preferably the number of the sections of molds supported by the carrier corresponds to the number of indexing movements so that each time the carrier is indexed a new section is filled and a preceding section is emptied.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
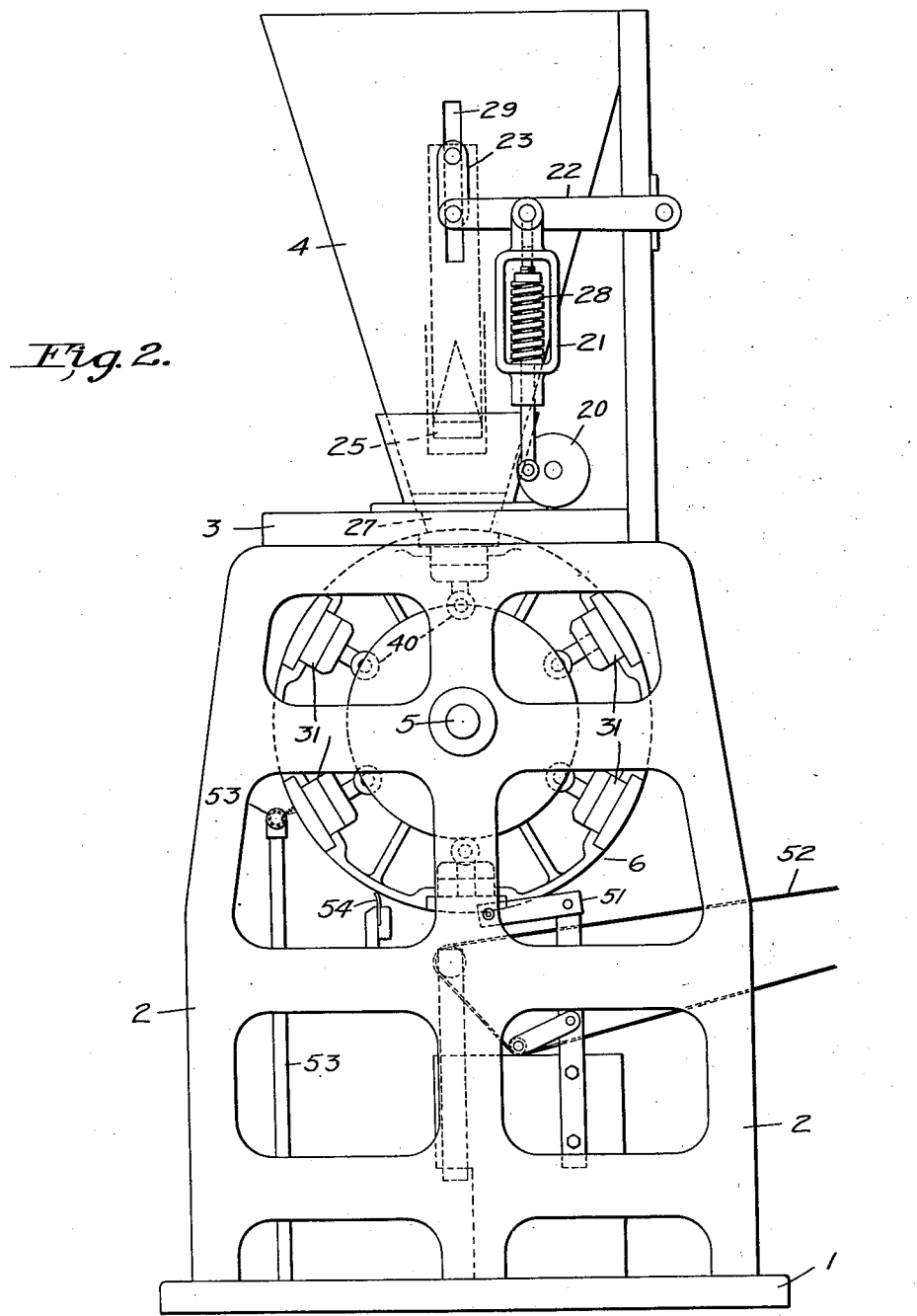
Figure 3:
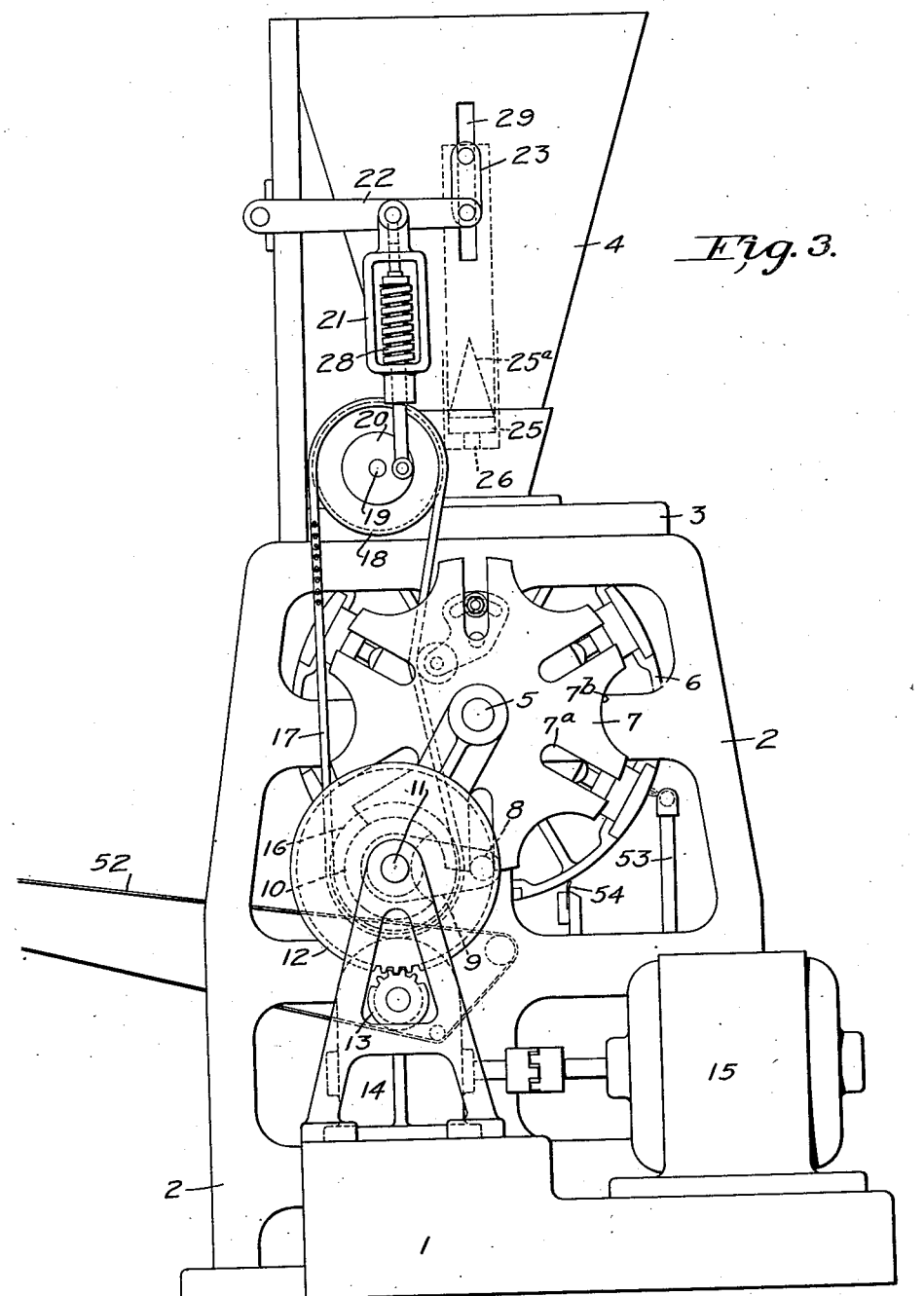
Figure 4:
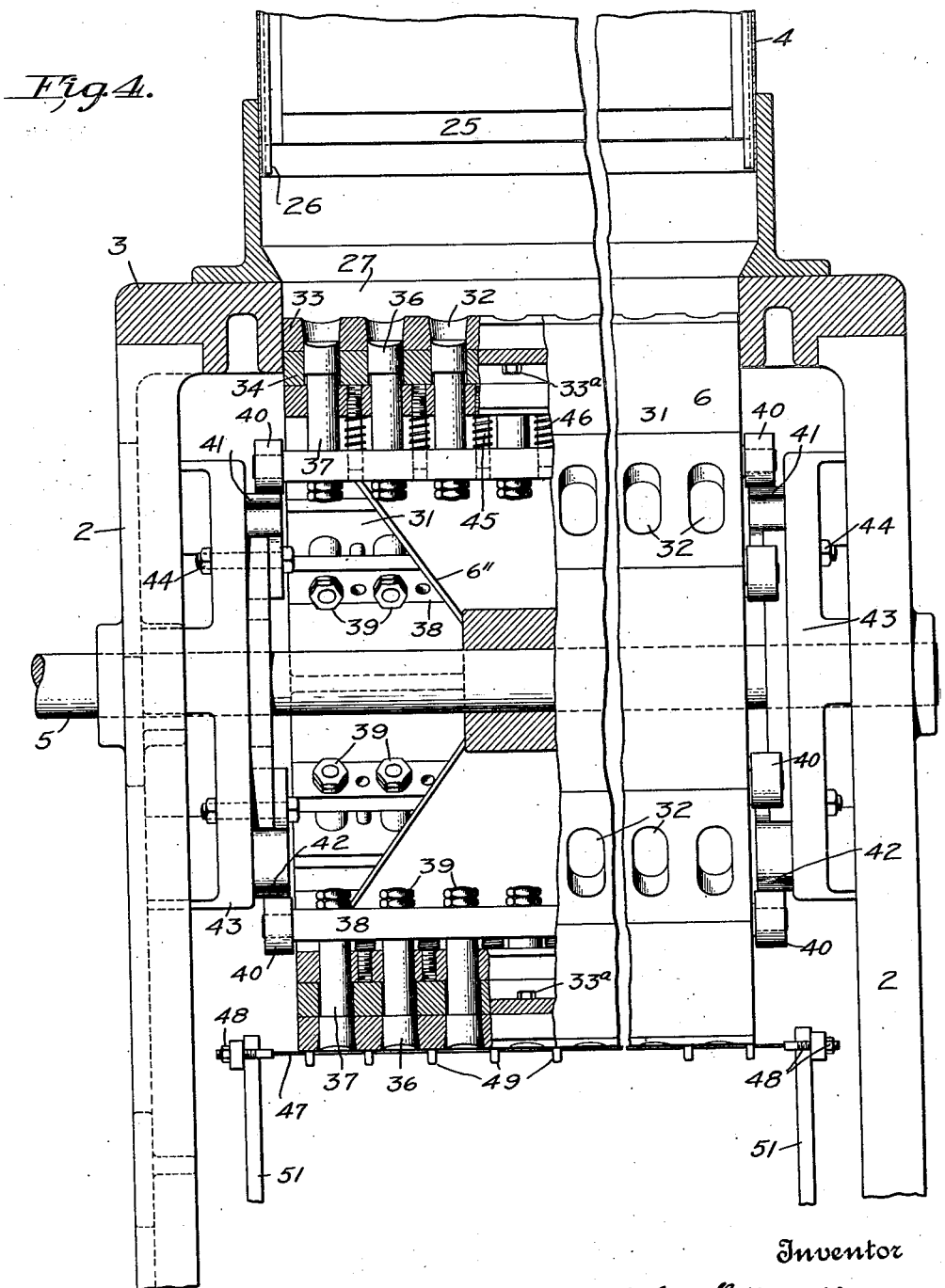
Figure 5:
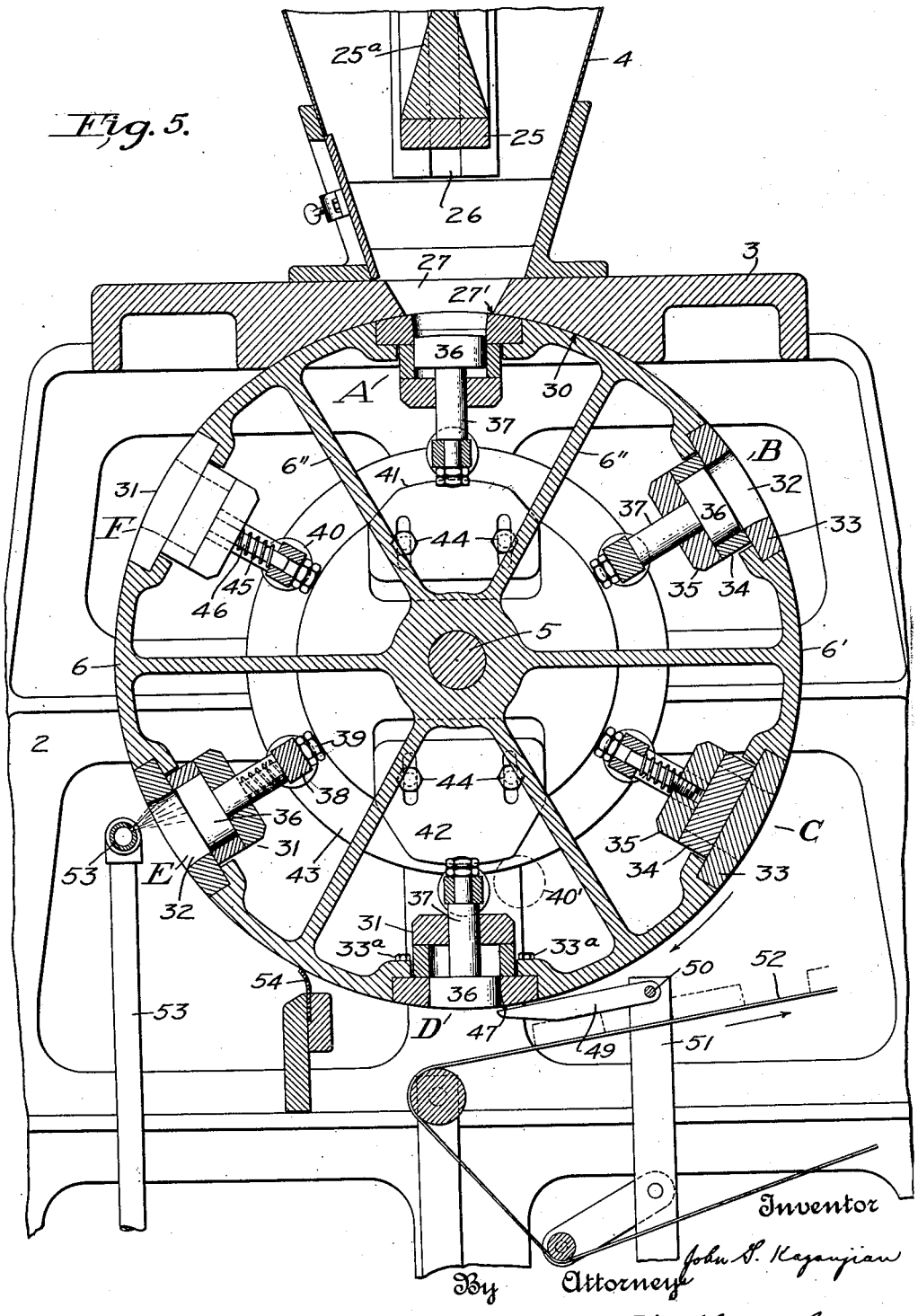

Figure 1 is a side elevation of a molding machine embodying my invention. Fig. 2 is a right end elevation of Fig. 1. Fig. 3 is an elevational view of the opposite end more clearly showing the driving mechanism. Fig. 4 is an enlarged view, partly in section, of a portion of Fig. 1 showing cam means for reciprocating the matrix plungers later to be referred to, and means for disengaging the formed product therefrom. Fig. 5 is an enlarged transverse sectional view illustrating the various positions of the plungers as the carrier is indexed about its axis.

Referring more particularly to Fig. 1 of the drawings the machine comprises a base 1, upright standards 2, and bridge member 3 securely holding the standards together and forming a support for a hopper 4. Suitably journaled in bearings provided by the standards 2, is a rotatable shaft 5 upon which is mounted a matrix carrier 6. The outer end of the shaft 5 carries a Geneva wheel 7 provided, in this particular case, with six radial slots 7a and six locking portions 7b. However, the number of slots and locking portions may be varied in accordance with the number of indexing positions desired of the matrix carrier 6.

A driving roller 8, rotatably secured to a lever 9, intermittently engages the slots in the disk 7 and gives to the carrier 6, successive partial rotations of 60° each. As the roller leaves a slot in the disk, a concentric portion 10 of the lever 9 engages one of the arcuate portions 7b of the disk 7 and securely holds the latter from further rotation.

The Geneva lever 9 derives its rotation through shaft 11, gears 12 and 13, a speed reducing unit 14, and prime mover 15. It will be understood that the driving mechanism and indexing mechanism just described represents but one form of mechanism adapted to impart an intermittent rotary motion to the matrix carrier and obviously other types may be employed which will produce the same result.

Secured to the inner end of the shaft 11 is a sprocket wheel 16, and which, by means of a link belt 17, drives the sprocket wheel 18, mounted upon a shaft 19, supported by the bridge member 3. Each end of the shaft 19 carries a disk or eccentric 20, to which spring links 21 are pivotally mounted. The upper end of the links are pivoted to levers 22 which, through the medium of a short link 23 and cross-arm 24 reciprocate a filling ram 25 slidably mounted within the hopper 4. Guideways 26 serve to maintain the ram 25 in position directly over a throated opening 27 formed in the bridge member 3. It will thus be apparent that as the ram is caused to move downwardly a quantity of the contents of the hopper will be urged through the throat 27, sufficient space being provided between the sides of the ram and the hopper to allow the surplus to find its way upwardly beside the ram.

In case the hopper becomes too tightly packed at its narrow end before the downward stroke of the ram is completed, provision is made for absorbing the further motion of the ram. Under such conditions, the springs 28 in the extensible links 21, permit the link members to become extended and thus save the machine from undue strains and possible fracture, and at the same time maintaining, as close as possible, uniformity in the weight of the molded articles.

The upper surface of the ram 25 is provided with a fin-like portion 25a permitting any easy ascent thereof through the mass contained within the hopper. The elongated openings 29, through which the cross-arm 24 projects, are suitably sealed against leakage in order that the full capacity of the hopper may be utilized.

The matrix carrier and its functioning will now be described, referring more particularly to Figs. 4 and 5. The matrix carrier, designated generally as 6, consists chiefly of a drum 6', rigidly braced by web members 6", and mounted to rotate freely with the shaft 5. The periphery of the carrier is adapted closely to engage an undercut portion 30 of the bridge 3 in order that none of the contents of the hopper may escape therebetween.

In the drawings I have shown the carrier comprising six integrally formed sections, each section supporting a tray or rack 31 containing ten individual molds 32. The number of sections and number of individual molds in each section may, however, be varied in order to suit the particular requirements or production demanded.

In order that different styles of molds may be used on the same machine, I preferably construct the carrier with removable sections 31, although the molds may be formed integral with the carrier, if desired.

Each of these sections or units is of three-part construction, to wit, an outer plate 33, spacer member 34, and base plate 35, all securely held together by screws and dowels (not shown). The outer plate 33 is provided with a series of matrices 32, of the desired size and configuration, and is firmly secured to the carrier in a suitable manner as by means of bolts 33a.

The ejecting mechanism for the molds comprises slidably mounted bottom members consisting of a head member 36 and shank member 37. The head member 36 is of a size and shape closely conforming to the shape of the matrices 32 and fits within an opening in the intermediate plate 34. The movable bottoms are adapted, at certain times, to be projected outwardly so as to fill the matrix 32, thereby ejecting the contents of the molds. In order that the depth of a plurality of molds may be regulated or their contents ejected at the same instant, the plungers 36 of each of the units 31 are securely connected to a horizontal bar 38 by means of the lock nuts 39. Thus, movement of the bar 39 affects the positions of all of the plungers of that section.

Ready removability of the molds, and replacement thereof by other molds, as provided by this invention, results in decided advantages in that it affords convenient means for varying the shape or size of the molded product, whereby a single molding machine readily, and without difficulty, may be changed from a run of one kind, or form, of candy to another, thereby greatly increasing the utility of the machine. To effect this change it is necessary only to remove the simple retaining bolts 33a (see Fig. 5) and remove as a unit, the elements, 33, 34, 35, 36, 37, 38, 39 and 40, and replace the unit by another having different molds.

Rollers 40 mounted on the ends of the bar 38, are adapted to engage stationary cams 41 and 42 and thus translate the bar 38 and plungers 35 radially. Cam 41 is a depth-setting or measuring cam, that is to say, the setting of this cam determines the distance that the plungers 35 project into the matrices 32 while at the filling station and thereby regulate the cubical content of the molds. When rollers 40 are indexed further around so as to engage the expelling cam 42, the plungers are moved outwardly their full distance thereby discharging the contents of the mold.

The cams 41 and 42 are adjustably secured to a plate 43 by means of bolts 44 for adjustment purposes. It will be seen, adjustment of the cams radially, correspondingly affect the positioning of the plungers when the rollers 40 are brought into engagement therewith. Other style cams may be used, for example, a continuous groove face cam or a single piece barrel cam, appropriately contoured may be employed in place of the two shown, however, inasmuch as only a small portion of such cams would be utilized I prefer to employ two cams, and to make each cam individually adjustable.

During the travel of the matrices between the filling and expelling positions the plungers 36 are withdrawn to their most inward position by a suitable means, such as, coiled springs 45. These springs encircle guide rods 46 and urge the bars 30 away from the base plates 35. They also urge the rollers 40 connected to the bar 38 tightly into engagement with the cams 41 and 42 during the time that the matrices are in their filling and ejecting positions. Cams, having an endless groove, may also advantageously be used for this purpose.

I shall assume now that one of the sections of molds have been filled and indexed to a position such that the roller 40 has reached a position indicated by 40' in Fig. 5. In this position the roller has reached the "high" point of the expelling cam 42, the plungers 36 have been extended their full distance, and the contents of the mold fully discharged therefrom.

It sometimes happens that because of the constituents making up the molded article and also the suction created by the relatively wide flat face of the plunger 36 the article will adhere thereto and must be positively disengaged at the proper time. I therefore provide a dislodging device in the form of a tightly drawn wire 47 for removing the molded units from the plungers just prior to completion of the indexing movement. As illustrated in Figs. 4 and 5 the wire is supported at each end and its tension adjusted by means of screws and nuts 48. In addition to the end supports I provide intermediate supports in the form of fingers 49 having slightly notched ends adapted to form a seat for the wire. The other ends of the fingers 49 are secured to a cross-rod 50 supported by a bracket 51 and may be adjusted thereabout in order that the wire may be brought into engagement with the carrier.

As the carrier is advanced the wire 47 separates the molded article from the plunger 36. The article is then free to fall upon a travelling belt or conveyor 52 and is carried away from the machine. Such a device insures that each section of molds deposits its contents upon the conveyor at predetermined intervals in uniform alignment for a subsequent operation.

It will be noted that the distance between the conveyor and matrix carrier is subject to being varied in order that the distance through which the article must fall, when detached from the plungers, will be as little as possible. Injury to the newly molded article is thereby practically eliminated.

The carrier is then indexed further and brings the now empty matrices to the cleansing station marked E in Fig. 5. In this position the plungers are fully retracted and the empty cavities are washed with a suitable cleansing fluid conveyed from a source under pressure through conduits 53. The used fluid is prevented from reaching the candy deposited upon the conveyor by means of a fluid deflecting element comprising a rubber strip 54 engaging the periphery of the carrier intermediate the ejecting and cleansing stations. As the carrier advances further the roller 40 rides up the depth setting cam 41 and causes the heads 36 to be projected a predetermined distance into the matrices just prior to their being moved into the filling position.

The timing of the machine is such that during the dwell between indexing movements of the carrier, the ram 25 is on the downward stroke and the molds are being filled. The ram finishes its downward stroke just after the filled mold is moved away from the opening 27 in the bridge. This timing is important in order that pressure remains on the contents of the mold and keeps it filled until it passes under the bridge portion 3. The molds are thus filled under pressure and, as the indexing takes place, leveled off flush with the periphery of the carrier by the shearing action of the wall 27' of the opening in the bridge.

After the filled molds are moved away from the opening 27, and before they pass from under the bridge member, the rollers 40 ride down the side of cam 41 thereby permitting the plungers to retract slightly. This retraction of the plungers enlarges the molds and permits the molded article to expand to its normal size before passing from under the bridge. If the plungers were not so retracted the expansion of the article would take place as the mold emerges from under the bridge and cause the surface of the article to bulge unequally. However, since the retraction of the plungers permit the articles to expand uniformly before the molds are exposed, irregularities in the shape of the molded products is thereby avoided.

The operation of the machine, briefly, is as follows. A quantity of the material to be molded is inserted into the hopper and the machine started. A row of empty molds is brought into position marked A, and filled, the cams 41 previously having been set to position the faces of the plungers at a predetermined depth in the matrices. The carrier then indexes, shearing off the filled molds and bringing another set of empty ones into filling position. At positions B and C the plungers, under the action of the springs 45, have dropped back slightly as before explained. When the roller 40 reaches the position indicated by 40' the plungers have been extended their full distance and the molded article about to be disengaged therefrom by the wire 47. The carrier, in completing the indexing movement, causes the wire 47 to dislodge the molded articles from the face of the plunger. It may be mentioned here that the faces of the plungers 36, which form the bottoms of the molds, are slightly convex, having the same radii, as the carrier. Thus it will be seen that the plungers, in their fully projected positions, come flush with the periphery of the carrier at all points. This is particularly desirable in order that the disengaging device may make a clean sweep over the entire area of the plunger and thereby remove the article intact. The disengaging device, although illustrated as a tightly drawn wire engaging the surface of the carrier and plungers, may be of varied constructions, for example, a flat blade such as a knife angularly positioned, or an abutment, or any other means which will remove the article without changing or altering its true form, may be employed.

The carrier continues its indexing movement until the section of empty molds reaches position E where they are washed or rinsed out before being filled again. The carrier indexes the molds through position F and finally reaches the filling position A where a new cycle is initiated.

Since the operation of the machine is continuous and entirely automatic, mass production is made possible at a rate depending largely upon the temperature, the degree of firmness or density of the molding material and the number of molds filled each time the carrier indexes. In the machine illustrated, it will be observed that five dozen units may be molded upon each complete revolution of the carrier.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:

1. A molding machine combining a frame; a matrix carier supported thereby, said carrier being provided with a removable section; retaining means comprising a stud for said section, one or more molding compartments formed in said section; and ejecting mechanism for said molding compartments, said ejecting mechanism and said section being removable as a unit by the removal of said retaining means.

2. A rotatable matrix carrier combining a plurality of removable sections; matrices formed in each of said sections; movable plungers within said matrices and readily removable therewith as a complete assembly and replaceable by other assemblies; means to move said plungers outwardly to discharge the contents of the matrix; and means to disengage the molded unit from said plunger.

3. A candy molding machine combining a frame; a plurality of series of matrices removably supported by said frame; retaining means, comprising a stud for each series of matrices; adjustable bottoms for said matrices; a hopper adapted to supply moldable material to said matrices; and means automatically to adjust the bottoms of a series of matrices prior to the filling thereof thereby to control the cubical capacity of said matrices.

4. A molding machine combining a carrier; a plurality of series of molds carried thereby, each of said series being detachable as a unit; indexing mechanism for said carrier; a hopper adapted to supply a quantity of moldable material to one of the series of molds; a bridge adjacent to said hopper; means for filling one of said series of molds under pressure and means adapted to relieve the pressure in the filled molds after they have been filled and removed from the filling position and before they pass from under the bridge portion.

5. A molding machine combining a frame; a matrix carrier supported thereby; a plurality of sections removably secured to said matrix carrier, each of said sections being provided with a series of molding compartments having adjustable bottoms; retaining means comprising a stud for each of said sections, whereby each section may be removed as a unit, by removal of said retaining means, and replaced by another section having different molding compartments; and cam-controlled means for adjusting the position of said bottoms to predetermine the cubical capacity of said compartments.

6. A molding machine combining a carrier; a plurality of series of molds carried thereby; indexing mechanism for said carrier; a hopper adapted to supply a quantity of moldable material to one of the series of molds; a bridge adjacent to said hopper; means for filling one of said series of molds under pressure and means adapted to relieve the pressure in the filled molds after they have been filled and removed from the filling position and before they pass from under the bridge portion.

7. A candy molding machine comprising a hopper; a carrier rotatably journaled directly beneath said hopper; a plurality of molds spaced equidistantly about said carrier; indexing means to give said carrier step-by-step movements successively to place said molds directly beneath the discharge end of said hopper; a plunger reciprocably mounted in said hopper and adapted to be given vertical reciprocations therein, said plunger being of such size and having sufficient movement to discharge from said hopper more candy than is required to fill the molds therebeneath, said plunger also being materially narrower than said hopper thereby permitting the excess candy to be forced upwardly beside said plunger and thereby remain in said hopper; and means, coordinated with the indexing movement of said carrier, to reciprocate said plunger while said carrier is at rest.

8. A candy molding machine comprising a hopper adapted to hold plastic candy; a drum rotatably mounted directly beneath said hopper; a plurality of series of molds carried by said drum; means to index said drum successively to place said series of molds beneath and in register with the discharge end of said hopper whereby plastic candy in said hopper tends to flow by gravity into said molds; a plunger reciprocably mounted in said hopper and actuated in timed relation with the rotation of said drum thereby at each reciprocation to force candy from said hopper into one of said series of molds, said plunger being materially narrower than said hopper thereby permitting the excess candy to be forced upwardly beside said plunger, said plunger having a tapered upper portion to facilitate upward movement of the plunger through the mass of plastic candy in said hopper.

9. A candy molding machine comprising a frame; an elongated drum rotatably journaled thereon; a plurality of series of variable capacity molds arranged equidistantly about the periphery of said drum, the molds of each series being arranged in a row lengthwise of said drum; means to give said drum indexing movements corresponding to the spacing of said series of molds; a hopper supported by said frame above said drum and having its discharge end in register with a series of said molds; a horizontally disposed ram reciprocably mounted in said hopper and having its ends projecting through the end walls of said hopper; and means engaging the opposite ends of said ram and coordinated with the indexing movement of said drum to reciprocate said ram, thereby to cause it to displace in said hopper plastic candy in amount in excess of that required to fill a series of said molds when adjusted to their maximum capacity, said ram and hopper being so constructed and arranged as to permit the excess candy to flow upwardly beside said ram and to remain in said hopper.

10. A candy molding machine comprising a horizontally disposed drum provided with a plurality of molds arranged equidistantly about its periphery; a vertically arranged hopper located above said drum and having its delivery end in close proximity to said drum; means to give said drum indexing movements successively to align said molds with the delivery end of said hopper; vertically arranged guideways provided at opposite sides of said hopper; a cross-arm slidingly mounted in said guideways; a vertically reciprocable plunger carried by said cross-arm within said hopper and movable thereby toward said delivery end to displace candy in said hopper and discharge a portion thereof into said molds, said plunger being materially smaller than said hopper thereby permitting a portion of the displaced candy to flow upwardly about said plunger; crank means at opposite sides of said hopper; and impositive driving connections between said crank means and said cross-arm.

11. A candy molding machine comprising a frame; a drum rotatably journaled thereon; a plurality of molds arranged equidistantly about the periphery of said drum; means to give said drum indexing movements corresponding to the spacing of said molds; a hopper supported by said frame above said drum and having its discharge end adapted to register with said molds; a ram reciprocably mounted in said hopper and adapted to force candy from said hopper into the molds therebeneath; means operative during the indexing of said drum to eject molded candy pieces from said molds; a dislodging device for said candy pieces comprising a taut wire extending lengthwise of said drum adjacent the periphery thereof; means to convey the dislodged pieces away from the machine; means operative after said candy pieces have been ejected from said molds and dislodged from said drum to cleanse said molds, said means including a stream of fluid under pressure directed into said molds, and means including a strip of flexible material bearing against the periphery of the drum intermediate the discharging and cleansing stations, to prevent the cleansing fluid from flowing around said drum back to said discharge station.

JOHN G. KAZANJIAN.